US009712996B2

(12) United States Patent
Park

(10) Patent No.: US 9,712,996 B2
(45) Date of Patent: Jul. 18, 2017

(54) PROFILE MANAGEMENT METHOD, EMBEDDED UICC, AND DEVICE PROVIDED WITH THE EMBEDDED UICC

(71) Applicant: KT CORPORATION, Seongnam-si, Gyeonggi-do (KR)

(72) Inventor: Jaemin Park, Seoul (KR)

(73) Assignee: KT CORPORATION, Seongnam-Si (KR)

( * ) Notice: Subject to any disclaimer, the term of this patent is extended or adjusted under 35 U.S.C. 154(b) by 146 days.

(21) Appl. No.: 14/347,172

(22) PCT Filed: Sep. 25, 2012

(86) PCT No.: PCT/KR2012/007705
§ 371 (c)(1),
(2) Date: Mar. 25, 2014

(87) PCT Pub. No.: WO2013/048084
PCT Pub. Date: Apr. 4, 2013

(65) Prior Publication Data
US 2014/0237101 A1   Aug. 21, 2014

(30) Foreign Application Priority Data
Sep. 28, 2011  (KR) ........................ 10-2011-0097901

(51) Int. Cl.
G06F 15/173 (2006.01)
H04W 8/20 (2009.01)
H04W 12/06 (2009.01)
H04W 8/18 (2009.01)
H04L 29/08 (2006.01)
H04W 4/00 (2009.01)
H04L 9/00 (2006.01)

(52) U.S. Cl.
CPC .............. *H04W 8/20* (2013.01); *H04L 9/006* (2013.01); *H04L 67/30* (2013.01); *H04L 67/303* (2013.01);
(Continued)

(58) Field of Classification Search
CPC ..... H04B 1/3816; H04L 67/30; H04L 67/303; H04L 67/306; H04L 9/006
(Continued)

(56) References Cited

U.S. PATENT DOCUMENTS 9,319,223 B2 *  4/2016  Nix .......................... G06F 21/35
2011/0117961 A1 *  5/2011  Kim ....................... H04W 4/00
                                                             455/558
(Continued)

FOREIGN PATENT DOCUMENTS

KR   10-2008-0000950 A    1/2008
KR   10-2010-0019235 A    2/2010
WO       2008/126576 A1  10/2008

OTHER PUBLICATIONS

International Search Report of PCT/KR2012/007705, dated Mar. 18, 2013.

*Primary Examiner* — Davoud Zand
(74) *Attorney, Agent, or Firm* — Sughrue Mion, PLLC

(57) ABSTRACT

The present invention relates to a method for managing a profile in an embedded UICC, and more particularly, to a method for managing a profile in an embedded UICC that enables management information on the profile provided within the embedded UICC to play an essential role for providing communication and additional services, to be provided to a device existing outside the embedded UICC. The present invention also relates to an embedded UICC and to a device provided with the embedded UICC for the method.

9 Claims, 6 Drawing Sheets

(52) U.S. Cl.
CPC ........... *H04L 67/306* (2013.01); *H04W 4/001* (2013.01); *H04W 4/005* (2013.01); *H04W 8/183* (2013.01); *H04W 8/205* (2013.01); *H04W 12/06* (2013.01)

(58) Field of Classification Search
USPC ........................................ 709/223, 225, 226
See application file for complete search history.

(56) References Cited

U.S. PATENT DOCUMENTS

| | | | | |
|---|---|---|---|---|
| 2011/0125967 A1* | 5/2011 | Kim | ........................ | H04W 4/00 711/115 |
| 2011/0270747 A1* | 11/2011 | Xu | ....................... | G06Q 20/102 705/40 |
| 2012/0331292 A1* | 12/2012 | Haggerty | ............. | H04L 63/0272 713/168 |
| 2013/0157673 A1* | 6/2013 | Brusilovsky | .......... | H04W 8/205 455/450 |
| 2014/0134981 A1* | 5/2014 | Park | ...................... | H04W 12/06 455/411 |
| 2014/0220952 A1* | 8/2014 | Holtmanns | ........... | H04W 8/183 455/418 |
| 2015/0143125 A1* | 5/2015 | Nix | .................... | H04W 52/0235 713/171 |
| 2015/0163056 A1* | 6/2015 | Nix | ........................ | H04L 9/0869 380/46 |
| 2015/0271662 A1* | 9/2015 | Lhamon | ................ | H04W 8/183 370/329 |
| 2015/0350916 A1* | 12/2015 | Selander | ............... | H04W 12/10 455/411 |

\* cited by examiner

PROFILE MANAGEMENT METHOD, EMBEDDED UICC, AND DEVICE PROVIDED WITH THE EMBEDDED UICC

CROSS REFERENCE TO RELATED APPLICATIONS

This application is a National Stage of International Application No. PCT/KR2012/007705 filed Sep. 25, 2012, claiming priority based on Korean Patent Application No. 10-2011-0097901, filed Sep. 28, 2011, the contents of all of which are incorporated herein by reference in their entirety.

TECHNICAL FIELD

The present invention relates to a method of managing a profile in an embedded universal integrated circuit card (eUICC), an eUICC and a device equipped with an eUICC for the same. More specifically, the present invention relates to a method of identifying and utilizing information about a profile inside the eUICC from an external.

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently use the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

On the other hand, according to the recent introduction of the eUICC, it becomes necessary to update information about subscribers of various mobile network operators in a UICC remotely. Accordingly, a Subscription Manager (SM) or a Profile Manager (PM) for management of information about subscribers is being discussed.

As described above, as opposed to the conventional removable SIM, an embedded UICC (hereinafter, referred to as 'eSIM' or 'eUICC') has many issues such as an authority of opening, an initiative on value-added services, security of subscriber information, etc. due to differences of its physical structure. For these, international standardization organizations such as a GSMA and a European Telecommunication Standards Institute (ETSI) are performing standardization on necessary elements including top structures by interworking with related entities such as operators, manufacturers, SIM vendors, etc.

As described above, a subscription manager (SM) is being focused upon in the standardization organizations as a main issue of the standardization on the eUICC. The SM means an entity or a function/role of performing overall managements on the eUICC such as issuing profiles ('Operator Credentials', 'Profile'), and processing a procedure of subscription change, etc.

However, a method of providing and utilizing management information such as types of profiles, profile identification information, a profile list, etc., which is loaded in the eUICC and essential for providing communication and value-added services, does not exist.

DISCLOSURE

Technical Problem

The present invention provides a method of managing profiles in an eUICC, which can make management information about profiles installed in the eUICC and essential for providing communication and value-added services provided to an external entity of the eUICC.

The present invention also provides a method of receiving and utilizing management information about a profile in an eUICC from the eUICC.

The present invention also provides a management profile managing management information about profiles in an eUICC efficiently, and making the eUICC interwork with an eUICC external entity (for example, a terminal, an MNO, a SM, etc.) conveniently.

Technical Solution

An example embodiment of the present invention provides a method of managing profiles in an embedded universal integrated circuit cart (eUICC) interworking with a mobile network operator (MNO) and a subscription manager (SM), comprising a step of providing, by the eUICC, at least one of information about types of activated profiles and information about a list of the activated profiles to an external entity.

Another example embodiment of the present invention also provides an embedded universal integrated circuit card (eUICC) interworking with a mobile network operator (MNO) and a subscription manager (SM), comprising a management information providing module providing at least one of information about types of activated profiles and information about a list of the activated profiles to an external entity.

Other example embodiment of the present invention also provides a device managing an embedded universal integrated circuit card (eUICC), which is equipped with the eUICC interworking with a mobile network operator (MNO) and a subscription manager (SM), comprising a management information acquisition part acquiring at least one of information about types of activated profiles and information about a list of the activated profiles from the eUICC.

Still other example embodiment of the present invention also provides a method of managing profiles in an embedded universal integrated circuit card (eUICC) interworking with a mobile network operator (MNO) and a subscription manager (SM), the method comprising performing, by the MNO, a network authentication with a device equipped with the eUICC based on a profile selected in a list of profiles provided from the eUICC; and updating, by the MNO, a management profile managing the list of profiles in the eUICC based on an activated profile.

MODES OF THE INVENTION

Figure 1:
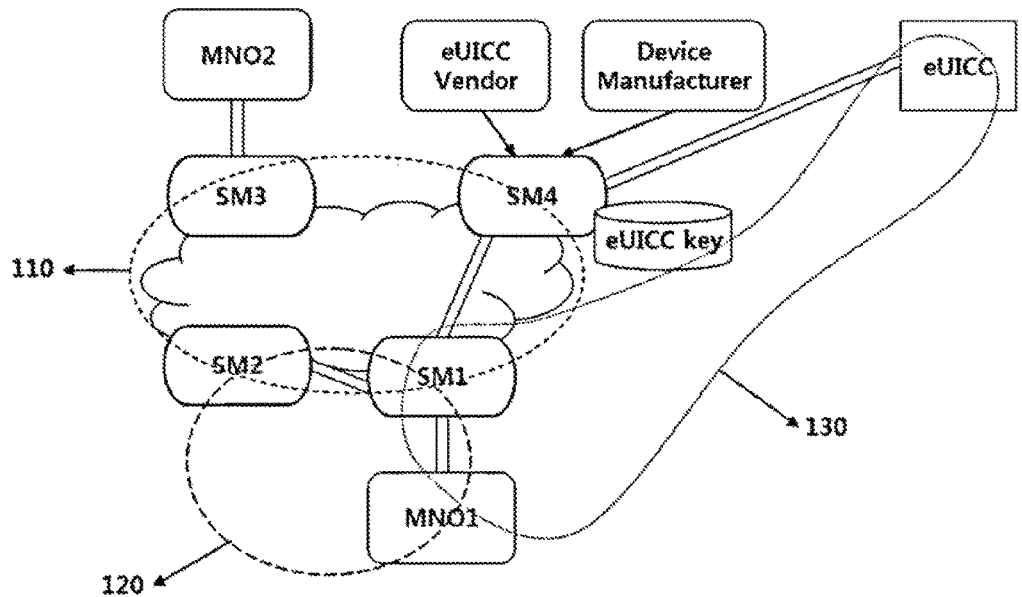
FIG. 1 illustrates an overall service architecture including an eSIM (eUICC) to which the present invention is applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal. Thus, an MNO placing an order for terminals and a manufacturer of the terminals should consider a stock inventory of manufactured terminals, and which becomes a reason of increasing sale prices of terminals. These problems are being big obstacles to expanding bases of M2M terminals.

As described above, as opposed to the conventional removable SIM, an embedded SIM (hereinafter, referred to as 'eSIM' or 'eUICC') has many issues such as an authority of opening, an initiative on value-added services, security of subscriber information, and so on. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM. The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Recently, the GSMA proposed a structure in which the SM is divided into a SM-Data Preparation (SM-DP) performing a role of generating operator information and a SM-Secure Routing (SM-SR) performing a role of direct delivery of the operator information. However, detail, technical, and actual issuing mechanism has not been mentioned.

Therefore, in the present invention, a method of managing eSIM using generation of a dynamic encryption key (such as a public key, etc.) is proposed in the above described environment of separated roles of SM defined in the GSMA.

In this specification, the terminologies 'eSIM' and 'eUICC' are used as an identical concept.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key (such as a UICC OTA key, a Global Platform Issuer Security Domain (GP ISD) key, etc.).

Here, the management key (an eSIM management key or an eUICC management key) is used to deliver operator information securely to the eSIM as an access authentication key, and differentiated from an encryption key (a public key, etc.) which is mainly described in the present invention. The management key may also be represented as 'eUICC access credentials' which will be explained later.

In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc.

Also, a structure of a 'Circle of Trust' shown in FIG. 1, which has a concept that an end-to-end trusted relation between an MNO and an eSIM is established based on overlapped trusted relations between each similar entity and entities, has been proposed. That is, a first MNO (MNO1) forms a trusted relation with a first SM (SM1), the first SM (SM1) forms a trusted relation with a fourth SM (SM4), and the fourth SM (SM4) forms a trusted relation with the eSIM. Accordingly, the trusted relation between the MNO and the eSIM may be established.

Before explaining the present invention, terminologies used in this specification are explained.

An 'MNO' means a mobile network operator, an entity providing mobile communication services to its customers through mobile networks.

Also, a 'SM' means a subscription manager, and performs a function of managing an eUICC.

Also, an 'eUICC supplier' means a provider of an eUICC module and resident software (such as a firmware, an operating system, etc.).

Also, a 'device vendor' means a provider of devices (that is, terminals) which require an UICC (or, an eUICC), especially, devices including a function of a wireless modem for a mobile network operated by an MNO.

Also, a 'provisioning' means a procedure of loading a profile into an eUICC, and a provisioning profile means a profile used for a device to access a communication network for the purpose of provisioning other provisioning profiles or operational profiles.

Also, a 'subscription' means a commercial relationship between a subscriber and a mobile communication service provider (an MNO) providing services to the subscriber.

Also, 'eUICC access credentials' mean data in an eUICC, used for setting up secured communications between the eUICC and an external entity to manage profiles in the eUICC.

Also, 'profile access credentials' mean data in a profile or the eUICC, used for setting up secured communications between the eUICC and an external entity to protect or manage a profile structure and data of the profile.

Also, a 'profile' means all information which can exist in the eUICC, a file structure which can be provisioned to the eUICC, or managed in the eUICC, combinations of data and applications. The profile may include an operational profile (that is, operator information), a provisioning profile (a profile for provisioning), a profile for other policy control functions (PCF), and so on.

Here, an 'operational profile' or 'operator information' means all kinds of profiles related to an operational subscription.

FIG. 1 illustrates an overall service architecture including an eSIM (eUICC) to which the present invention is applied.

The entire system may be explained as follows.

An eUICC system architecture to which the present invention is applicable may comprise a plurality of MNO systems, at least one SM system, an eUICC vendor system, a system of a manufacturer of a device equipped with an eUICC, and an eUICC. Explanations on each entity are as follows.

In FIG. 1, a dotted line represents a circle of trust, and a line comprising two full lines means a secured link.

If a scenario in which subscription information is stored and delivered is needed, it should be performed under authorization of an MNO and control of the MNO. Only one active profile should exist in a single eUICC at a certain time. At this time, the active profile means a profile added to a single HLR at the certain time.

An MNO and an eUICC should be able to decode MNO credential information, that is, profiles (an operational profile, a provisioning profile, etc.). The only exception for this may be a third party organization trusted by a specific MNO, for example, a SIM vendor. However, it is not a general function of the third party organization for performing the function.

A subscription cannot be switched in an eUICC when it is out of an operational policy control. A user should know any change in an MNO context and its activated subscription, be able to avoid a security danger, and require a security level up to a degree of competing with a current UICC model.

MNO credentials or a profile may mean subscription credentials including K, an algorithm, parameters for an algorithm, a value-added service application, value-added service data, etc.

A delivery of the MNO credentials or the profile should be performed from end to end in a secured manner. The delivery may be performed with continuous steps which do not break a security chain, and all the steps in the delivery chain should be performed under identification and authorization of an MNO. Although any entities in the delivery chain should not be able to identify the MNO credentials, the only exception is a third party organization trusted by a specific MNO, for example, a SIM vendor. However, it is not a general function of the third party organization.

An operator should have a complete right in controlling its credentials, and have strong rights in directing and controlling SM operations.

The SM functions should be provided by an MNO or a third-party organization. If they are provided by a third-party organization, there may be a commercial relationship between the SM and the MNO.

For managing subscriptions, the SM does not have any direct relationships with subscribers of an MNO. Although an MNO is required to have relationships with subscribers and to be an entry point for customer subscription, it is intended that the MNO go along with a contact between a M2M service provider (that is, a subscriber of the MNO) and customers of the M2M service provider.

When MNOs are being swapped, a donor MNO and a receiving MNO may have a previously made contract or not. A mechanism for approving the previous contract is necessary. A function of policy control of the donor operator may define a condition for removing it credentials, and a policy control function (PCF) may implement such the function.

The architecture introduces a function defined as a SM, and a main role of the SM is preparing a package or a profile including MNO credentials and delivering it to an eUICC. The function of a SM may be provided directly by an MNO. Or, an MNO may make a contract with a third-party organization in order to obtain a SM service.

A role of the SM may be divided into two sub functions such as a SM-SR and a SM-DP.

Actually, the functions of SM-SR and SM-DP may be provided by different entities or a single entity. Therefore, a boundary between the functions of SM-SR and SM-DP is required be set clearly, and interfaces between the two entities are required to be defined.

The SM-DP may be responsible for securely preparing a package or profile to be delivered to an eUICC, and interwork with the SM-SR for actual transmission of the package or profile. The core functions of the SM-DP are as follows. In addition to the following functions, additional functions may be added later.

1) Managing functional characteristics and certification level of an eUICC

2) Managing MNO credentials and profiles (for example, they include at least one of IMSI, K, additional service applications, and additional service data. Also, some of them may be enciphered by an MNO.)

3) Calculating an OTA package for downloading by the SM-SR

If the functions of the SM-DP are provided by a third-party organization, security and trusted relationship may become more important. In addition to a function of a real-time provisioning, the SM-DP may have a function of background processing to a not inconsiderable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor, a device (such as a M2M terminal, etc.) vendor, and, potentially, an MNO, and may be used by an MNO through a SM-SR mesh network.

The circle of trust may enable an end-to-end secured link during the delivery of a provisioning profile, and the SM-SR may share the circle of trust for a safe routing of the provisioning profile and an eUICC discovery. An MNO may be linked to SM-SR and SM-DP entities in the circle of trust, or, the MNO may provide these functions autonomously. In order to prevent an illegal use of an eUICC (such as cloning, illegal uses of credentials, service denying, illegal MNO context change, etc.) without violation of duties based on contracts or regulations, a secured end-to-end link between an eUICC and MNO credential is required.

That is, in FIG. 1, a notation 110 may represent a circle of trust formed between SMs, more specifically a circle of trust formed between SM-SR members, and a notation 120 may represent a circle of trust between MNO partners, and a notation 130 may represent an end-to-end secure link.

Figure 2:
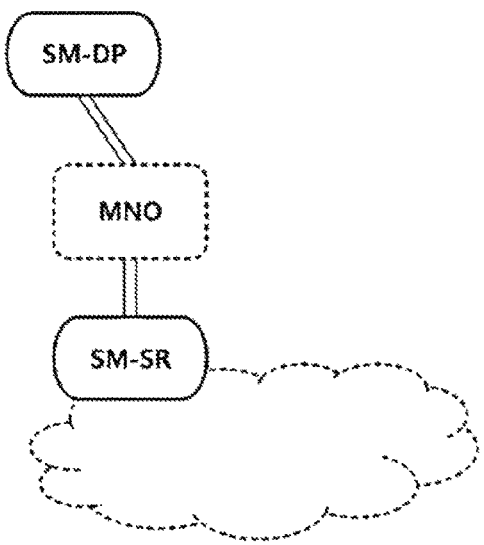
FIG. 2 illustrates a configuration in which a SM-SR and a SM-DP are located in a system, in an environment in which a role of SM is separated.

FIG. 2 illustrates a configuration in which a SM-SR and a SM-DP are located in a system, in an environment in which a role of SM is separated.

As shown in FIG. 2, a SM may be divided into a SM-DP which safely prepares various profiles related to an eUICC (such as an operational profile of an MNO, a provisioning profile, etc.) and a SM-SR for routing them. Also, the SM-SR may interwork with other multiple SM-SRs with trusted relationships, and the SM-DP may interwork with an MNO system.

Of course, arrangement of the SM-DP and the MNO system may be implemented differently from the case of FIG. 2. That is, the SM-DP may interwork with the SM-SR, and the MNO system may interwork with the SM-DP.

Under the above described eUICC system architecture, an eUICC according to an example embodiment of the present invention may comprise a mechanism of guaranteeing integrity, confidentiality, and authenticity for loading various profiles (such as a provisioning profile, an operational profile, etc.). As an example of the mechanisms, an encoding/decoding mechanism using a public key and a private key of an eUICC as profile access credentials and an electronic signature mechanism using a public key and a private key of a SM may be included selectively.

In other words, various profiles should be protected very safely in an eUICC architecture through a safe mechanism which can guarantee integrity, confidentiality, and authenticity. Accordingly, a safe mechanism for protecting the profiles is needed since the profiles are transmitted to an eUICC (not provisioned in a manufacturing step).

An eUICC according to an example embodiment of the present invention may manage or handle various profiles (such as a provisioning profile, an operational profile, etc.) by using profile access credentials in the eUICC.

More specifically, in the present invention, an eUICC have at least one set of profile access credentials (for example, a public key of an eUICC, etc.) for securely provisioning various profiles transmitted from an end point (for example, a SM) such as a provisioning profile, an operational profiles, etc. Also, the eUICC may decode a ciphered profile transmitted by an external entity by using the profile access credentials, as will be explained in a following example embodiment.

In addition, in an example embodiment of the present invention, only a single active profile is preferred to exist in an eUICC. A profile or profile management data should be transmitted between an end point reliably connected to an operating system having the profile or the profile management data and an eUICC. Also, the profile of the profile management data cannot be accessed by an external entity such as a device or a terminal. For this, in an example embodiment of the present invention, a method using an eUICC public key as profile access credentials, which can encode/decode the profile of the profile management data, is included.

In the specification, profile access credentials mean data used for decoding a profile received from an external entity such as a SM or an MNO, and is not limited to the terminology. That is, it may be represented using a different terminology such as profile installation credentials, profile installer credentials, etc. which can perform the same function.

Figure 3:
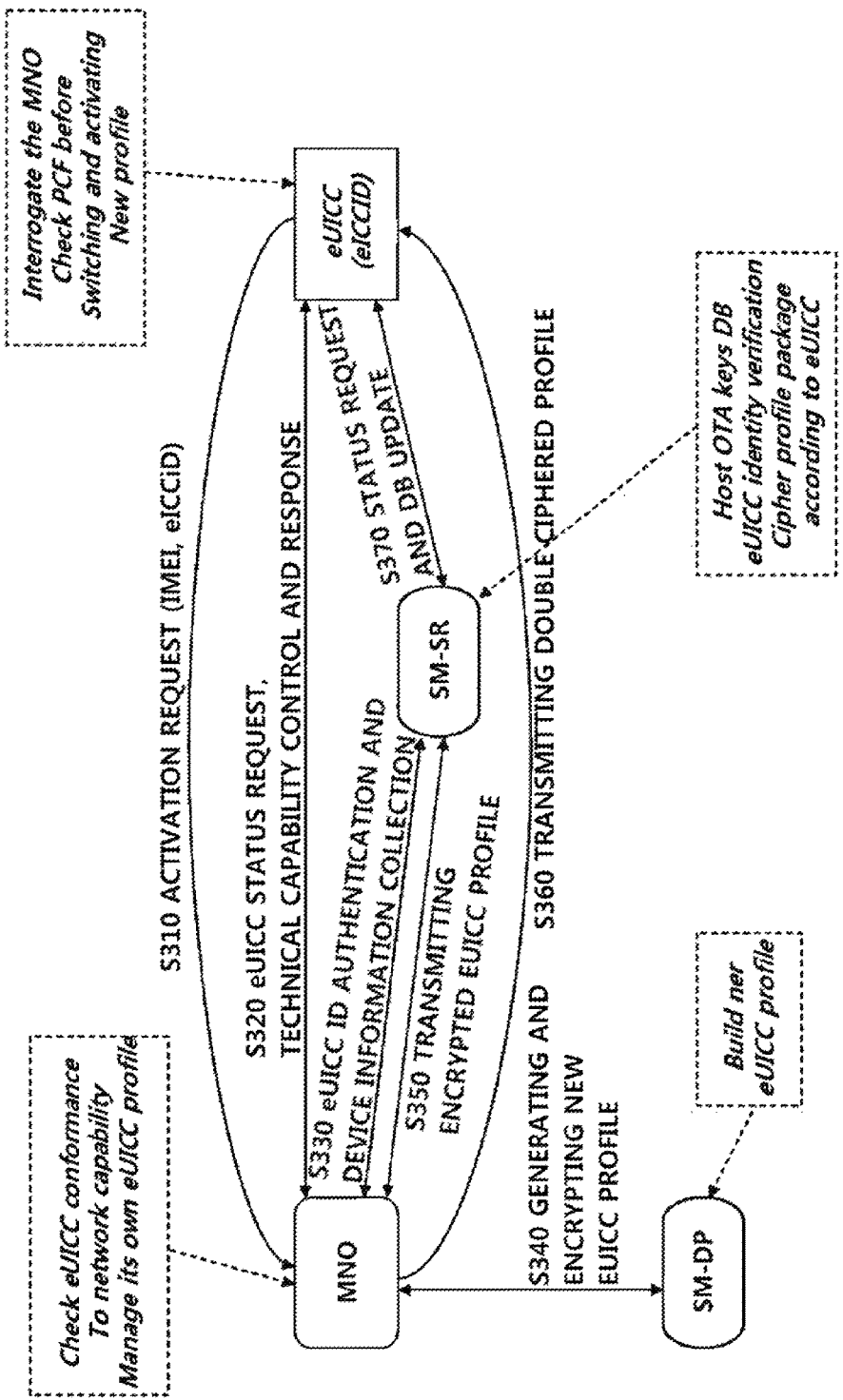
FIG. 3 is a flow chart to explain a provisioning procedure corresponding to a first subscription in a system to which the present invention is applied.

FIG. 3 is a flow chart to explain a provisioning procedure corresponding to a first subscription in a system to which the present invention is applied.

In the provisioning procedure, an eUICC may transmit an activation request including device identification information (such as IMEI, etc.) and eUICC identification information (such as eICCid, etc.) to an MNO (at S310). Then, a request of an eUICC status and request/confirmation of a technical capability control are performed (at S320).

Also, although not illustrated in FIG. 3, a step, in which the eUICC provides its public key (PK) or key information of PKI (information about a key generation algorithm, a key length, a key generation manner, etc.) to a corresponding MNO system or a SM-SR, may be included in the step S320.

In the step S330, the MNO may verify an identity of the eUICC and collect information about the eUICC by cooperating with the SM-SR. In the step S330, the MNO may obtain an encryption key for the eUICC, specifically, a public key corresponding to the eUICC from the SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

Figure 8:
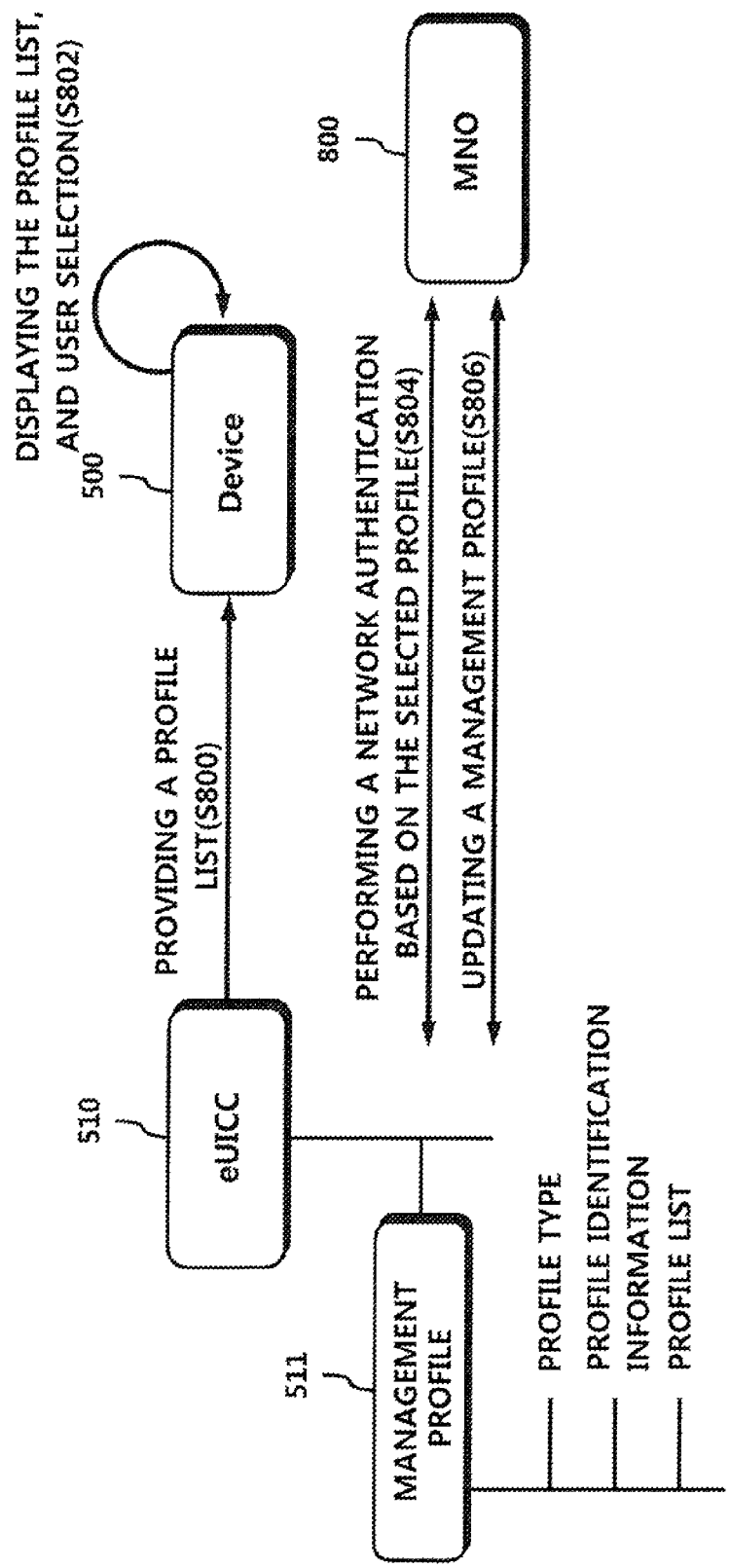
FIG. 8 is a flow chart for a method of utilizing a method of managing profiles according to an example embodiment of the present invention.

The dynamic procedure of obtaining the encryption key, which will be explained by referring to FIGS. 8 and 9, is that a SM-SR requests the eUICC to transmit a public key when there is a request (including identification information of the specific eUICC) from an MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, and so on. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S340; a first encryption step). At this time, the SM-DP may generate an additional electronic signature by using its private key in order to provide authenticity. That is, the SM-DP may make an electronic signature on the profile by using its private key for authentication (at S340).

Then, the MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S350).

Then, the MNO may transmit the double ciphered eUICC profile to the corresponding eUICC (at S360). At this time, the public key of the SM-DP or a certification may be transmitted to the eUICC with the eUICC profile in order to provide authenticity.

Since the eUICC already knows the eUICC management key, the eUICC may completely decode the profile to be used for a provisioning by performing a second decoding using the private key corresponding to its public key after the first decoding. The private key is already known in the manufacturing step or from the dynamic generation procedure as explained above. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

In the step S370, the SM-SR database may be updated based on status requests and corresponding responses between the eUICC which finished the provisioning and the SM-SR.

Main configurations for the above-described steps are explained as follows.

In the step S310, the eUICC identification information (eICCid, etc.) is open data, and integrated and protected in the eUICC.

In the steps S320 and S330, the status request and the technical capability control may provide verification on the eUICC identity (that is, verification on whether the eUICC is trustable or not), and should be able to verify a feasibility of a characteristic of the eUICC for an MNO service.

In the steps S340 to S360, a double ciphering mechanism is used for generating and transmitting the eUICC profile. In other words, the profile which is linked to the eUICC by the SM-DP is ciphered by a ciphering mechanism which can be read by the target eUICC. Also, an electronic signature may be made by the SM-DP for verifying that the profile has been generated by the right SM-DP. Also, the SM-SR may encrypt the generated profile using the eUICC management key so as to authenticate and protect the profile during delivery.

In the step 370, the SM-SR database may be updated at a final stage of the subscription installation.

Figure 4:
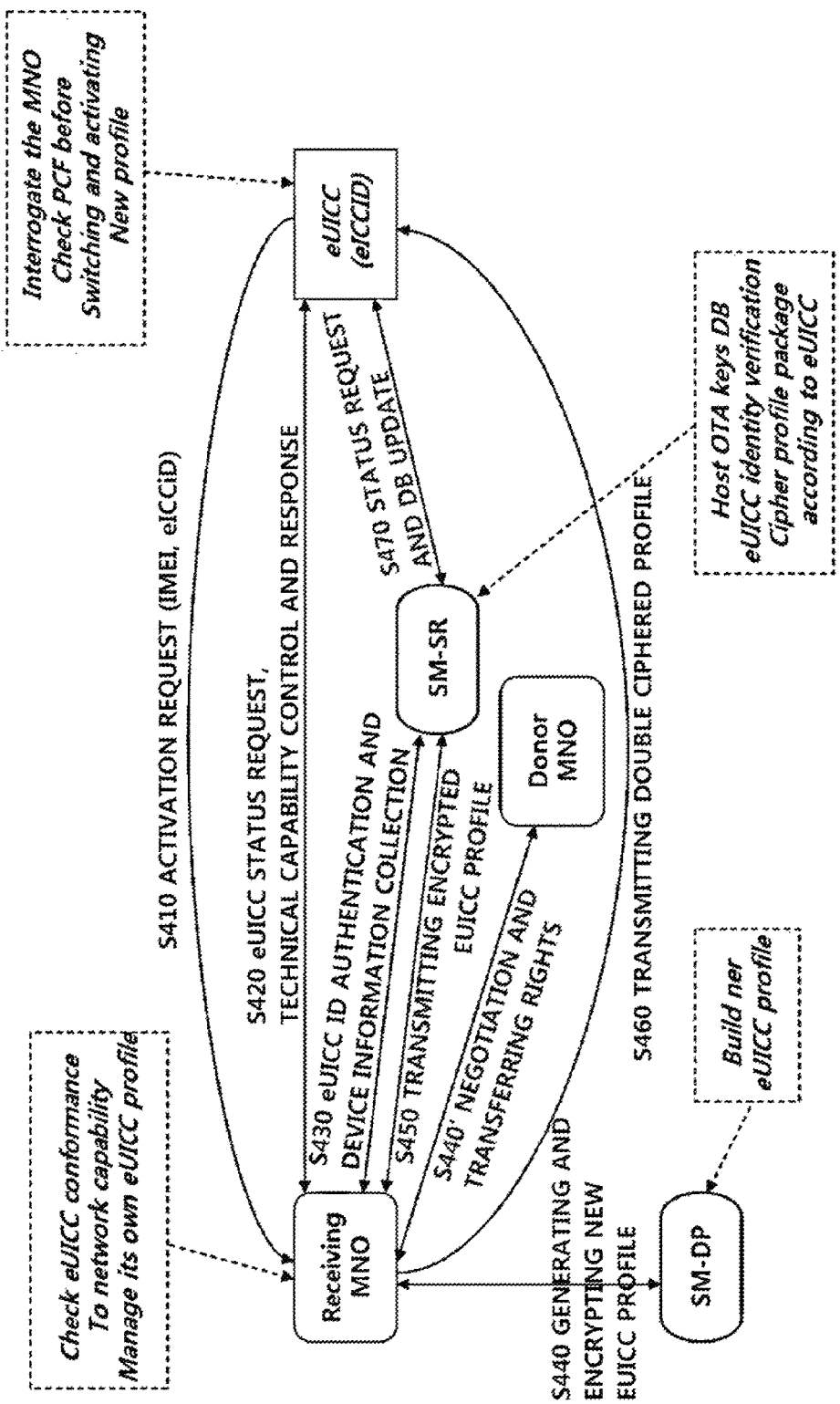
FIG. 4 is a flow chart explaining a procedure for subscription change or MNO change to which the present invention is applied.

FIG. 4 is a flow chart explaining a procedure for subscription change or MNO change to which the present invention is applied.

Generally, the procedure of FIG. 4 is similar to the provisioning procedure of FIG. 3. That is, a new MNO of FIG. 4, after changed, corresponds to an MNO of FIG. 3. The difference between two procedures is that the new MNO performs a procedure of negotiating and transferring right with a donor MNO before or after generation of a profile for the new MNO (at S440').

That is, the difference between an MNO change procedure of FIG. 4 and the provisioning procedure of FIG. 3 is that an activation request is transmitted using a provisioning profile or an operational active profile through a donor MNO OTA bearer, and the new MNO requests a path from the SM-SR in order to download a new profile through one of OTA and OTI.

The MNO change procedure of FIG. 4 is explained in detail as follows.

For changing an MNO, an eUICC may transmit an activation request including device identification information (IMEI, etc.) and eUICC identification information (eIC-Cid, etc.) to a receiving MNO which is to be changed (at S410). Then, an eUICC status request and a technical capability control are performed between the receiving MNO and the eUICC (at S420).

Also, even though not illustrated in FIG. 4, in the step S420 which will be explained in the following, a procedure in which the eUICC may provide its public key (PK) or PKI key information (such as a key generation algorithm, a key length, a key generation manner, etc.) which is profile access credential information, to the corresponding MNO system or the SM-SR may be included. This is similar to the provisioning procedure S320.

In a step S430, the receiving MNO may perform an eUICC identity verification and collect information about the device (eUICC) by interworking with the SM-SR. Also, according to an example embodiment of the present invention, the MNO may obtain an encryption key for the corresponding eUICC, specifically, a public key corresponding to the eUICC from a SM-SR.

The obtaining the public key may be performed statically or dynamically. When the obtaining is performed statically, a public key and a private key can be generated in the eUICC in the manufacturing step of the eUICC. Specifically, a CCP in the eUICC may generate the public key and the private key. The private key may be stored in the eUICC, and the public key may be shared by all SM-SRs so that all the SM-SRs can recognize the public key for the eUICC and a SM-SR corresponding to the eUICC can transmit the public key for the eUICC to the MNO in response to a request of the MNO.

The dynamic procedure of obtaining the encryption key, which will be explained by referring to FIGS. 8 and 9, is that a SM-SR requests the eUICC to transmit a public key when there is a request (including identification information of the specific eUICC) from an MNO. In this case, the eUICC may generate the public key by using an issuance processing module in a terminal equipped with the eUICC and a security module in the eUICC, and transmit the generated public key to the SM-SR. Here, the issuance processing module may be also referred to as a communication module, a provisioning module, an issuance module, an opening module, etc. without being limited to a specific terminology. That is, the issuance processing module may perform a role of communicating with the outside of the terminal and management of a provisioning. Also, the security module may be also referred to as an encryption key generation module, an encryption key processing module, a security policy module, a credential manager, a profile manager, etc. That is, the security module may perform generation of an encryption key and a security computation using the encryption key. The above procedure will be explained in further detail in the following description.

Here, a single security module may be commonly installed in the eUICC in the manufacturing step of the eUICC or later according to an eUICC policy. Alternatively, according to an eUICC policy and a policy of each MNO, multiple security modules may be installed for each MNO.

The receiving MNO which has obtained the public key (the encryption key) of the corresponding eUICC may generate a new eUICC profile corresponding to the MNO through the SM-DP, encrypt the profile using the obtained public key, and deliver the encrypted profile to the MNO (at S440; a first encryption step). At this time, the SM-DP may generate an additional electronic signature by using its private key in order to provide authenticity. That is, the SM-DP may make an electronic signature on the profile by using its private key for authentication in the step S440.

Also, a step S440' of negotiating and transferring right may be performed before or after the step S440. This step S440' is a procedure in which the receiving MNO requests the previous MNO (the donor MNO) to verify whether the eUICC is right or not and to transfer rights (information) according to the change of MNO.

In other words, in the step S440', the new receiving MNO may request authentication on the donor MNO for the subscription switching, and this authentication may be provided through a policy control function.

Then, the receiving MNO may deliver the first encrypted eUICC profile to the SM-SR, and request a second encryption. The SM-SR may perform the second encryption on the eUICC profile by using the eUICC management key (such as an eUICC OTA key, a GP ISD key, etc.) which has been already stored, and deliver the second encrypted profile to the MNO (at S450).

Then, the MNO may transmit the double ciphered eUICC profile to the corresponding eUICC (at S460). At this time, the public key of the SM-DP or a certification may be transmitted to the eUICC with the eUICC profile in order to provide authenticity.

Since the eUICC already knows the eUICC management key, the eUICC may completely decode the profile to be used for change of MNO by performing a second decoding using the private key corresponding to its public key after the first decoding. At this time, the eUICC may make an electronic signature using the public key of the SM-DP for checking a certificate (that is, for checking whether the profile is the eUICC profile generated from the SM-DP corresponding to the public key obtained from the MNO). Also, the effectiveness of the certificate may be checked by a trustworthy third-party.

In the step S470, the SM-SR database may be updated based on status requests and corresponding responses between the eUICC which finished the provisioning and the SM-SR.

In the above-mentioned methods of FIGS. 1 to 4, the eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as a connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, an applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key. In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc. the GSMA proposed a structure of a 'Circle of Trust' which has a concept that an end-to-end trusted relation between an MNO and an eSIM is established based on overlapped trusted relations between each similar entity and entities. That is, a first MNO MNO1 forms a trusted relation with a first SM SM1, the first SM SM1 forms a trusted relation with a fourth SM SM4, and the fourth SM SM4 forms a trusted relation with the eSIM. Accordingly, the trusted relation between the MNO and the eSIM may be established.

An eSIM provides communication and value-added services by issuing a profile from an external entity such as a SM, etc. in a software manner. However, methods for providing and utilizing management information, such as type information of a profile (for example, an operational profile, a provisioning profile, a policy control function (PCF), a value-added service (VAS) profile, etc.), type and identification information (for example, a profile ID, etc.) of currently activated profiles, a list of profiles installed in the eSIM, etc., has not been defined specifically.

Therefore, hereinafter, a method of managing profiles in an eSIM and a method of utilizing such the method, according to an example embodiment of the present invention, will be explained. However, hereinafter, the terminology 'eUICC' will be used for an embedded type smart card which can be referred to as an 'eSIM' or an 'eUICC'.

Figure 5:
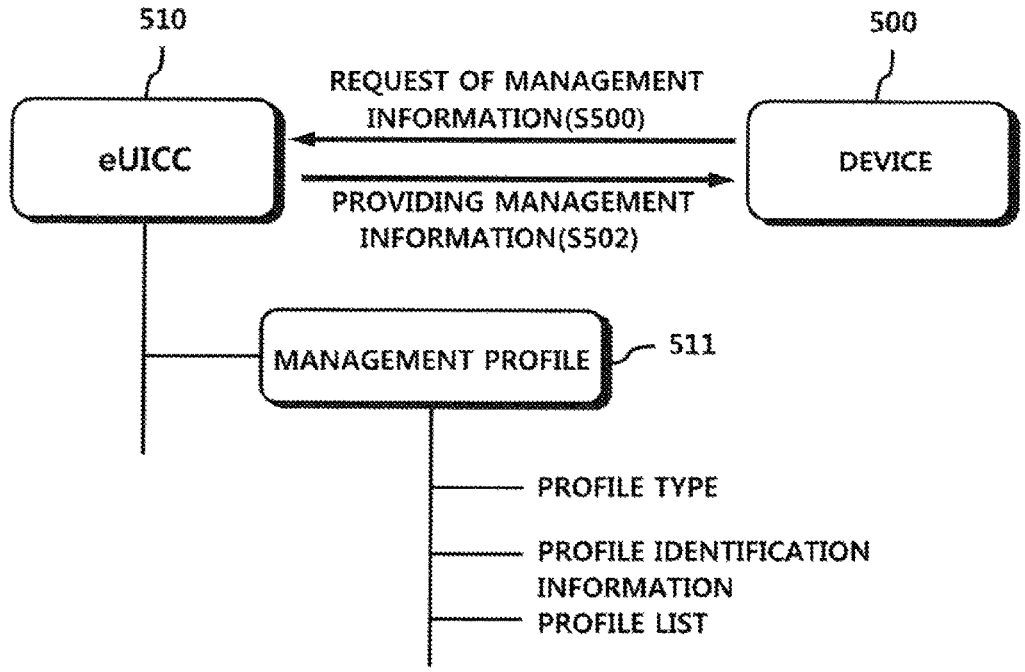
FIG. 5 is a view illustrating a basic structure of a method of managing profiles according to an example embodiment of the present invention.

FIG. 5 is a view illustrating a basic structure of a method of managing profiles according to an example embodiment of the present invention.

Referring to FIG. 5, a method of managing profiles according to an example embodiment of the present invention is related to a method of managing a profile in an eUICC 510 interworking with an MNO and a SM. The method may include a step S502 of providing at least one of information about type of activated profiles and information about a list of activated profiles, as management information needed for utilizing profiles, to an external entity.

Here, the external entity may be one of a device 500 equipped with the eUICC, an MNO, a SM, etc. For convenience of explanation, it is supposed that the device 500 equipped with the eUICC 510 is the external entity in FIG. 5. Also, in the following description, it will be explained that the eUICC 510 may provide management information needed for utilizing profiles to the device 500 equipped with the eUICC.

In the present specification, a "profile" may mean a combination of a file structure, data, and application (for example, an applet, etc.), and mean a profile for communication and value-added services, etc. or information having a form similar to such the profile.

As described above, the eUICC 510 may provide at least one of information about type of activated profiles and information about a list of activated profiles, as management information needed for utilizing profiles, to the external entity 500. In addition, the eUICC 510 may further provide at least one of profile identification information (for example, a profile ID, etc.) and profile description information (for example, an LTE profile for an operator A, a 3G profile for an operation A, etc.), as management information needed for utilizing profiles, to the external entity 500.

As described above, the 'management information' which the eUICC 510 provides to the external entity may be type information, identification information, list information, description information, etc. of activated profiles. Also, the management information may be type information, identification information, list information, description information, etc. of all or some profiles installed in the eUICC 510 as well as those of activated profiles.

The above-mentioned management information may be stored in the eUICC 510 in a form of a profile, and may be accessed under access control.

Also, such the management information may have a file structure of a TLV format based on the current SIM technology, or may be stored in an EF form or in an application form such as an applet, etc.

Also, such the management information may be accessed and managed according to access control through at least one of a security key and a PIN. Accordingly, the management information may be modified, activated, or deactivated by only an authorized entity including at least one of a SM (a SM-SR, a SM-DP, etc.) and an MNO. However, the management information can be freely read by an external entity. Of course, access right for each entity may be different according to a security policy of the eUICC 510.

In the present specification, the management information may be managed through a management profile 511 for managing profile information in the eUICC 510. Here, the management profile 511, for example, may be a profile for a policy control function (PCF), a general profile, a common profile, an administration profile, an administrative profile, an information profile, and the like.

As shown in FIG. 5, a basic structure according to an example embodiment of the present invention may comprise a management profile 511 managing information about profiles in the eUICC 510 and a device 500 equipped with the eUICC 510.

In a step 502, in order for the eUICC 510 to provide at least one of information about types of activated profiles and information about a list of activated profiles, as management information needed for utilizing profiles, to the device 500 equipped with the eUICC, the eUICC 510 may provide the management information to the device 500 directly without receiving any request, or may provide the management information to the device 500 in response to a management information request after receiving the request from the device 500.

FIG. 5 illustrates a case in which the management information is provided through a request-response procedure. As shown in FIG. 5, if the management information is provided through the request-response procedure, a step S500 of receiving, by the management profile 511 in the eUICC 510, the management information request from an external entity (for example, the device 500 equipped with the eUICC, etc.) may be performed prior to the step S502 of providing the management information.

Hereinafter, in connection with a method of managing a profile according to an example embodiment of the present invention, the device 500 equipped with the eUICC will be explained in further detail by referring to FIG. 6.

Figure 6:
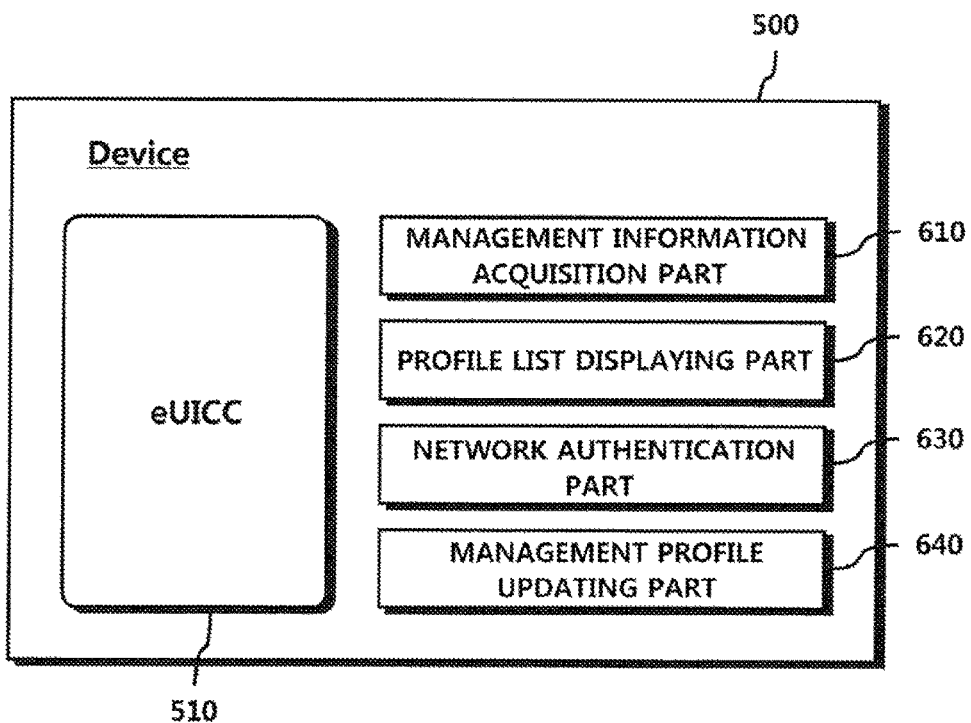
FIG. 6 is a block diagram illustrating a device 500 equipped with an eUICC according to an example embodiment of the present invention.

FIG. 6 is a block diagram illustrating a device 500 equipped with an eUICC according to an example embodiment of the present invention.

The device 500 equipped with an eUICC according to an example embodiment of the present invention, which is depicted in FIG. 6, is a device including the eUICC 510 interworking with an MNO and a SM.

Referring to FIG. 6, the device 500 may include a management information acquisition part 610 configured to acquire at least one of information about type of activated profiles and information about a list of activated profiles, as management information needed for utilizing profiles, from the eUICC 510.

The above-mentioned management information acquisition part 610 may further acquire at least one of identification information about activated profiles and description information about profiles in addition to the information about type of activated profiles and information about a list of activated profiles.

Also, the management information acquisition part 610 may acquire types, a list, identification information, description information about all or some profiles installed in the eUICC 510, etc. as well as those of activated profiles.

On the other hand, as shown in FIG. 6, the device 500 may further include a profile list displaying part 620 configured to display a profile list, a network authentication part 630 configured to perform network authentication with an MNO based on a profile selected by a user in the profile list, a management profile updating part 640 configured to update a management profile 511 based on activated profiles by interworking with an MNO after completion of the network authentication.

Hereinafter, an eUICC 510, which is installed in the device 500 having a configuration shown in FIG. 6, will be explained in further detail by referring to FIG. 7.

Figure 7:
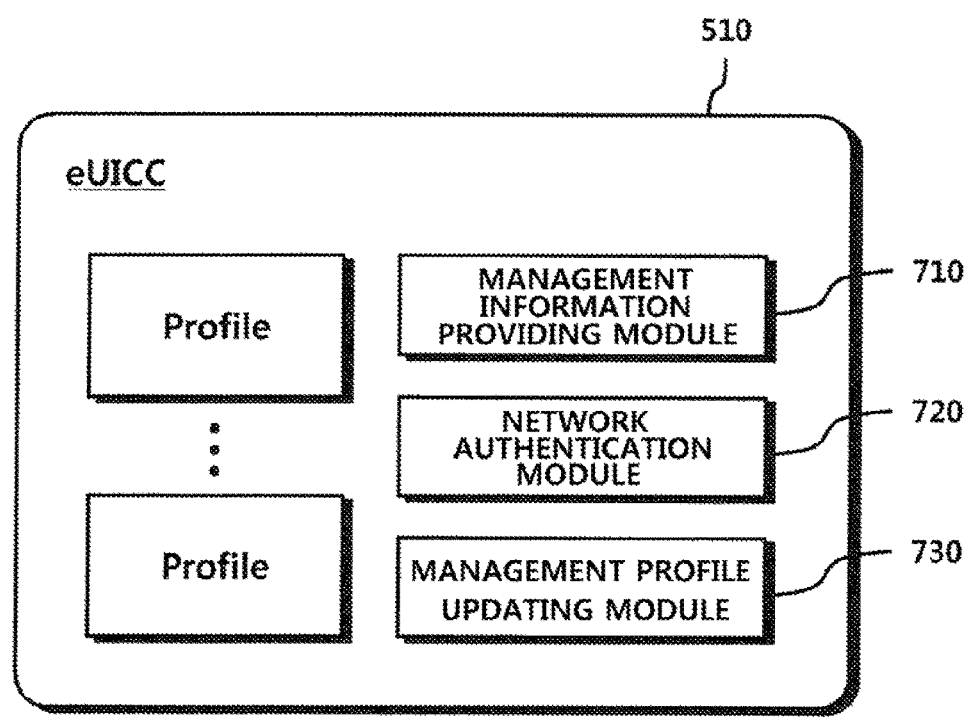
FIG. 7 is a block diagram illustrating an eUICC 510 according to an example embodiment of the present invention.

FIG. 7 is a block diagram illustrating an eUICC 510 according to an example embodiment of the present invention.

Referring to FIG. 7, the eUICC 510 according to an example embodiment of the present invention, as an eUICC interworking with an MNO and a SM, may include a management information providing module 710 providing at least one of information about type of an activated profile and information about a list of activated profiles, as management information needed for utilizing profiles, to an external entity.

Here, the external entity may be one of a device 500 equipped with the eUICC, an MNO, and a SM. However, for convenience of explanation, the external entity is supposed to be the device 500 equipped with the eUICC in the following description.

The above-mentioned management information providing module 710 may be, as an example, a management profile in the eUICC 510. In some cases, the management information providing module may be a profile manager as a logical entity in the eUICC 510, which is differentiated from a profile form.

On the other hand, referring to FIG. 7, the eUICC 510 according to an example embodiment of the present invention may further include a network authentication module 720, a management profile update module 730, etc. The network authentication module may perform network authentication with an MNO based on a profile selected in a profile list after the eUICC provided the profile list as management information needed for utilizing profiles to the device 500 equipped with the eUICC. Also, the management profile update module 730 may update a management profile 511 based on an activated profile by interworking with an MNO.

The above-mentioned management information, as described above, may include at least one of type information, identification information, list information, and description information about installed or activated profiles in the eUICC 510.

Such the management information may have a file structure in a TLV form or a file structure in an application form.

Also, such the management information may be accessed and managed by access control through at least one of a security key and a personal identification number (PIN). Thus, the management information may be modified, activated, or deactivated by an authorized entities including at least one of an MNO and a SM.

Hereinafter, an example of utilizing the above-mentioned method of management profiles will be explained. In the example of utilizing the above-mentioned method, it is supposed that the eUICC 510 provides information about a profile list to the device 500 equipped with the eUICC.

FIG. 8 is a flow chart for a method of utilizing a method of managing a profile according to an example embodiment of the present invention.

Referring to FIG. 8, a method of managing a profile in an eUICC interworking with an MNO 800 according to an example embodiment of the present invention may include a step S800 of providing a profile list, a step S802 of displaying the profile list and receiving user selection, a step S804 of performing network authentication, and a step S806 of updating a management profile.

A step S800 of providing a profile list: An eUICC 510 may provide a profile list to a device 500 equipped with the eUICC. At this time, the eUICC 510 may receive a request of a profile list, as management information for utilizing profiles, from the device 500 equipped with the eUICC, and transmit the profile list to the device 500 equipped with the eUICC in response to the request.

A step S802 of displaying the profile list and receiving user selection: The device 500 equipped with the eUICC may receive the profile list from the eUICC 510, display the received profile list, and be inputted selection information on a profile selected, by a user, in the displayed profile list.

At this time, the device 500 equipped with the eUICC may provide the selection information on the profile selected by a user to an MNO 800 or an eUICC 510.

A step S804 of performing network authentication: The MNO 800 may perform network authentication with the device 500 equipped with the eUICC based on the profile selected by a user in the profile list provided from the eUICC 510.

A step S806 of updating a management profile: After completing the network authentication, the MNO 800 may update a management profile 511 managing the profile list in the eUICC 510 based on an active profile.

At this time, the MNO 800 may update the management profile 511 managing the profile list in the eUICC 510 by interworking with a SM (a SM-SR, etc.).

Meanwhile, if a new profile is added or an existing profile is deleted in the eUICC 510, the MNO 800 may update the management profile according to current status of profiles in the eUICC.

As described above, according to the present invention, the device 500 equipped with the eUICC may identify type and identification information of an activated profile in the eUICC, and a profile list of profiles installed in the eUICC.

Accordingly, when a plurality of profiles are installed and activated in the eUICC 510, there can be an effect that utilization of basic information, which can make an operation of the device 500 equipped with the eUICC and its interoperation with an external system be shaped up efficiently and conveniently, becomes easy and convenient.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of managing profiles in an embedded universal integrated circuit card (eUICC) and mobile network operators (MNOs) interworking with each other and interworking with a subscription manager (SM), the method comprising:
   providing, by the eUICC, at least a list of the activated profiles to an external entity, the external entity being any entity external to the eUICC;
   performing, by an MNO, a network authentication with a device equipped with the eUICC based on a profile selected in a list of profiles provided from the eUICC, the list of profiles including a list of the activated profiles of the eUICC; and
   updating, by the MNO, a management profile managing the list of profiles in the eUICC based on an activated profile,
   wherein the providing said at least the list comprises the eUICC providing said at least the list of the activated profiles, as management information needed for utilizing profiles, to the external entity, and also providing profile identification information and profile description information for the activated profiles, as the management information, to the external entity.

2. The method of claim 1, wherein the management information is modified, activated, or deactivated by an authorized entity including at least one of the MNO and the SM.

3. The method of claim 1, wherein the management information is managed through a management profile in the eUICC.

4. The method of claim 3, further comprising receiving, by the management profile, a management information request from the external entity prior to the step of providing.

5. The method of claim 1, wherein the external entity is one of a device equipped with the eUICC, the MNO, and the SM.

6. The method of claim 1, wherein the MNO updates the management profile according to current status of profiles in the eUICC when a new profile is added to the eUICC and an existing profile is deleted in the eUICC.

7. An embedded universal integrated circuit card (eUICC) interworking with at least one from among mobile network operators (MNOs) and a subscription manager (SM), the eUICC comprising:
   a management information providing part providing information about types of activated profiles and information about a list of the activated profiles to an external entity, the external entity being any entity external to the eUICC;
   a network authentication part providing the list of the activated profiles to a device equipped with the eUICC, as the external entity, and then making a network authentication with the MNO performed based on a profile selected in the list of the activated profiles; and
   a management profile updating part making the management profile updated based on an activated profile by interworking with an MNO,
   wherein the management information providing part provides the information about types of activated profiles and the information about a list of the activated profiles, as management information needed for utilizing profiles, to the external entity, and also provides profile identification information and profile description information for the activated profiles, as the management information, to the external entity.

8. The eUICC of claim 7, wherein the management information providing part is a management profile in the eUICC.

9. A device managing an embedded universal integrated circuit card (eUICC), which is equipped with the eUICC interworking with at least one from among mobile network operators (MNOs) and a subscription manager (SM), the device comprising:
   a management information acquisition part acquiring information about types of activated profiles and information about a list of the activated profiles from the eUICC;
   a profile list displaying part displaying the list of the activated profiles which was provided to the device from the eUICC;
   a network authentication part performing a network authentication with an MNO based on a profile selected in the list of the activated profiles; and
   a management profile updating part making the management profile updated based on an activated profile by interworking with the MNO,
   wherein the management information acquisition part acquires the information about types of activated profiles and the information about the list of the activated profiles as management information needed for utilizing profiles, and the management information is managed through a management profile in the eUICC.

* * * * *